United States Patent [19]
Alack

[11] Patent Number: 5,271,439
[45] Date of Patent: Dec. 21, 1993

[54] SYSTEM FOR UNLOADING POWDERED OR GRANULAR MATERIALS

[75] Inventor: Charles S. Alack, St. Louis, Mo.

[73] Assignee: Semi-Bulk Systems, Inc., St. Louis, Mo.

[21] Appl. No.: 839,112

[22] Filed: Feb. 20, 1992

[51] Int. Cl.[5] .......................................... B65B 31/04
[52] U.S. Cl. ........................................ 141/65; 141/70; 141/73; 141/77; 141/78; 141/80; 366/184; 222/103; 222/203
[58] Field of Search ............... 141/10, 11, 12, 21, 141/65, 68, 70, 71, 72, 73, 74, 75, 76, 77, 78, 80, 114; 366/184, 114; 222/103, 203, 95, 202, 630, 631, 632; 100/144; 128/203.15, 205.15, 205.13, 205.25, 204.21; 604/58–64

[56] References Cited

U.S. PATENT DOCUMENTS

| | | | |
|---|---|---|---|
| 870,215 | 11/1907 | Bates | 141/10 |
| 1,336,612 | 4/1920 | Callahan | 141/75 |
| 1,570,795 | 1/1926 | Tainton | 222/1 |
| 1,649,362 | 11/1927 | Nagel | 141/10 |
| 1,728,394 | 9/1929 | Cornell et al. | 141/18 |
| 2,381,802 | 8/1945 | Booth et al. | 222/203 |
| 2,918,917 | 12/1959 | Emerson | 128/205.25 |
| 3,045,717 | 7/1962 | Vogt | 222/203 |
| 3,307,596 | 3/1967 | Stockel et al. | 141/10 |
| 3,363,806 | 1/1968 | Blakeslee et al. | 222/70 |
| 3,408,876 | 11/1968 | Andrews | 74/61 |
| 3,533,454 | 10/1970 | Tinsley | 141/10 |
| 3,568,733 | 3/1971 | Lau | 141/10 |
| 3,777,775 | 12/1973 | Handleman | 137/268 |
| 4,007,694 | 2/1977 | Fowler et al. | 108/55.1 |
| 4,013,075 | 3/1977 | Cocozza | 128/203.15 |
| 4,054,161 | 10/1977 | Alack | 141/12 |
| 4,149,755 | 4/1979 | Handleman et al. | 302/53 |
| 4,182,386 | 1/1980 | Alack | 141/83 |
| 4,241,769 | 12/1980 | Wiesner | 141/83 |
| 4,557,402 | 12/1985 | Morse | 366/184 |
| 4,889,114 | 12/1989 | Kladders | 128/203.15 |
| 5,109,893 | 5/1992 | Derby | 141/10 |

*Primary Examiner*—Henry J. Recla
*Assistant Examiner*—Steven D. Douglas
*Attorney, Agent, or Firm*—Senniger, Powers, Leavitt & Roedel

[57] ABSTRACT

A system for unloading powdered or granular materials from a container made of flexible material, the system including a line supplying compressed gas to the interior of the container to fluidize the material in the container, and a delivery conduit which may be attached to the container for delivering fluidized material from the container. A pair of arms are movable between a first position in which they are spaced from the container and a second position in which they engage and squeeze the container. Vibrators are provided for vibrating the container. The action of the arms and the vibrators facilitates unloading by breaking up clumps of the material in the container and preventing the formation of air pockets and material bridging.

22 Claims, 4 Drawing Sheets

5,271,439

SYSTEM FOR UNLOADING POWDERED OR GRANULAR MATERIALS

BACKGROUND OF THE INVENTION

This invention relates generally to material handling apparatus, and more particularly to a system for handling powdered or fine granular, fluent materials, the system enabling ready unloading of the material from a container without the formation of clumps of material or air pockets.

The unloading system of the present invention is particularly adapted for use with containers disclosed in U.S. Pat. Nos. 3,777,775, 4,007,694 and 4,182,386, which are commercially available from Semi-Bulk Systems, Inc., St. Louis, Mo., under the registered trademark "Air Pallet". The disclosure of the aforementioned patents is incorporated herein by reference. These containers have a rigid molded plastic pallet base and a flexible plastic film bag, are used to receive, transport and unload "semi-bulk" (e.g., 2,000-4,000 pounds or more) of powdered or finely divided granular material. Systems for loading and unloading such containers are disclosed in the U.S. Pat. Nos. 4,182,386 and 4,054,161 (the latter of which is also incorporated herein by reference).

The present system for unloading a container of the aforementioned type involves the injection of compressed air into the container for fluidizing the granular material to facilitate its flow out of the container through an outlet. In some instances, the material in the container may be difficult to fluidize (as in the case of certain powders densely compacted in the container), in which case the material tends to clump and to "bridge" the walls of the container to form air pockets. This hinders and may even prevent complete emptying of the container. Thus, there is presently a need for a system for efficiently and completely unloading powdered or granular materials of this type.

SUMMARY OF THE INVENTION

Among the several objects and features of the present invention may be noted the provision of a system for unloading powdered or granular material from a flexible container which maintains the material in a fluidized state to facilitate flow from the container; the provision of such a system which allows the container to be easily installed for unloading; the provision of such a system which applies vibratory motion to the container but isolates the other system components from the vibrations; and the provision of such a system which is economical to manufacture and easy to operate.

Generally, a system of the present invention is used for unloading powdered or granular materials from a container made of flexible material. The system comprises means for supplying compressed gas to the interior of the container to fluidize the material, and means attachable to the container for delivering fluidized material from the container. Means for squeezing the container is movable between a first position in which the squeezing means is spaced from the container and a second position in which the squeezing means engages and squeezes the container. Means is also provided for vibrating the container. The action of the squeezing means and the vibrating means breaks up clumps of material in the container and prevents the formation of air pockets.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
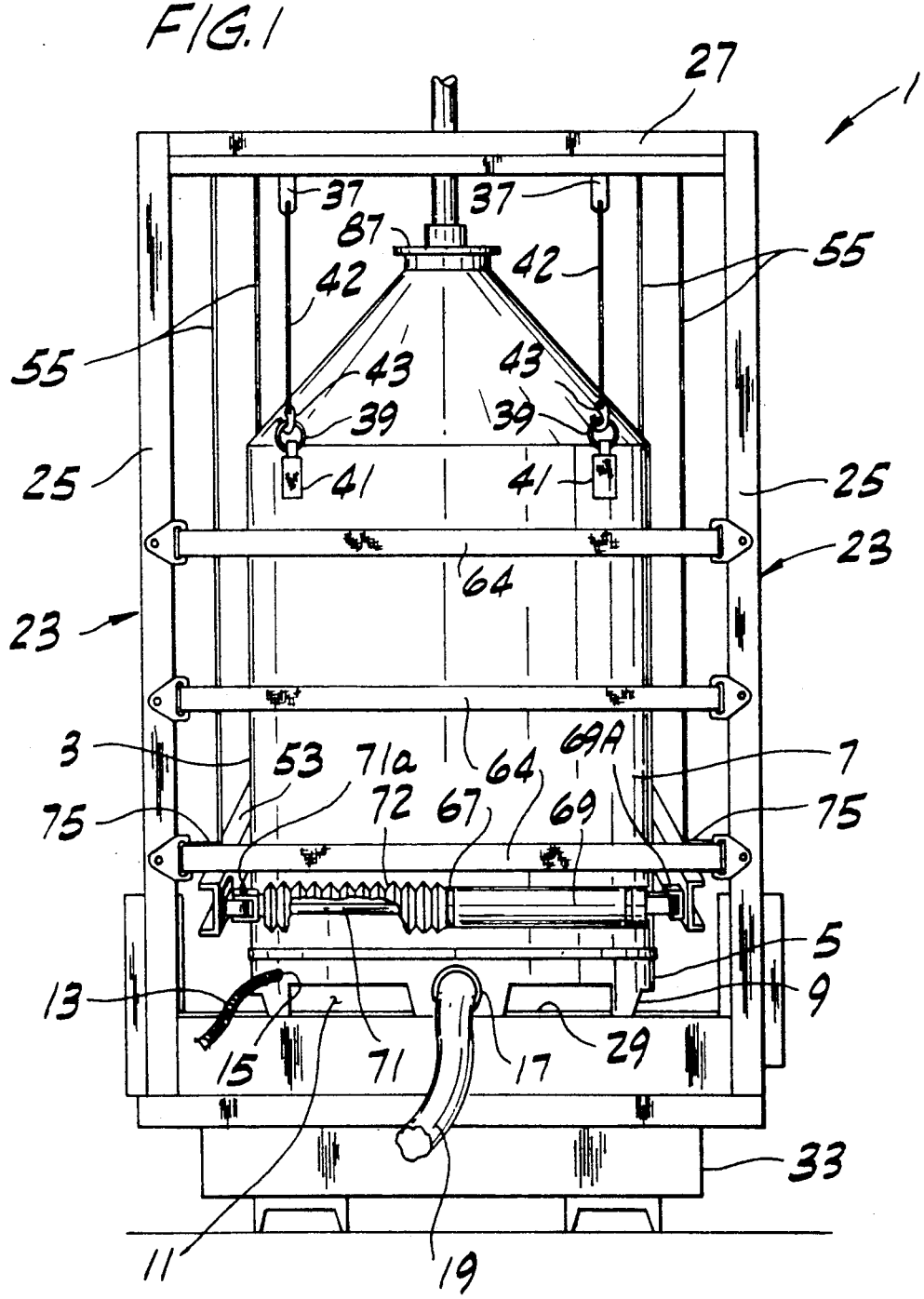
FIG. 1 is a front elevation of a container unloading system.

A system of the present invention, indicated generally at 1, is used for unloading powdered or granular materials from a container 3 such as an "Air Pallet" container of the type discussed above commercially available from Semi-Bulk Systems, Inc., including a substantially rigid base 5 of molded high-density plastic polyethylene or other air and water impervious synthetic resin material. A flexible wall bag 7 is sealably secured to the base 5 and defines a volume within which a load of powdered material may be loaded and contained. The base 5 has a plurality of legs 9 supporting the container and a plurality of openings 11 for receiving tines of a forklift (not shown) for transporting the container 3.

The container 3 is particularly adapted for rapid, fluidized unloading of its contents. The particulars of the construction of the container 3 and a basic system for unloading the container are described in detail in U.S. Pat. No. 4,182,386. Generally, the container 3 has a porous diaphragm (not shown) which covers an upper surface of the base 5 and is secured to the outer periphery of the base. The diaphragm overlies the base, such that a plenum is defined between the diaphragm and the base. Compressed air introduced into the plenum through a hose 13 (broadly "means for supplying compressed air to the interior of the container"), attached to an inlet 15 in the base 5, passes through the porous diaphragm and into the bag 7 where it fluidizes the material forming the load. The fluidized material passes through an outlet 17 at the front of the base 5 to a transporting conduit 19 attached to the base at the outlet.

A frame, indicated generally at 23, is made up of a plurality of frame members including side frame members 25 and top frame members 27 which form a tall rectangular superstructure for supporting the flexible wall bag 7 of the container 3. A platform 29 on which the container 3 rests is sloped forwardly to facilitate flow of material from the container through the outlet 17 of the base 5. The platform 29 and the frame 23 are supported by a scale 33, so that loading and unloading of the container 3 may be monitored by observing the increase or decrease in weight of the container as measured by the scale. Two sets of pulleys 37 are mounted on the top frame members 27, one set on each side of the container 3. The bag 7 has rings 39 attached by cloth straps 41 sewn onto the upper portions of the bag. Each pulley supports an associated line 42 having a hook 43 at one end. The hooks 43 may be attached to respective rings 39 and the lines 42 secured so that the bag 7 is supported partially by the frame 23. This facilitates unloading by holding the bag 7 in an erect, open configuration as the material is emptied from it.

Figure 2:
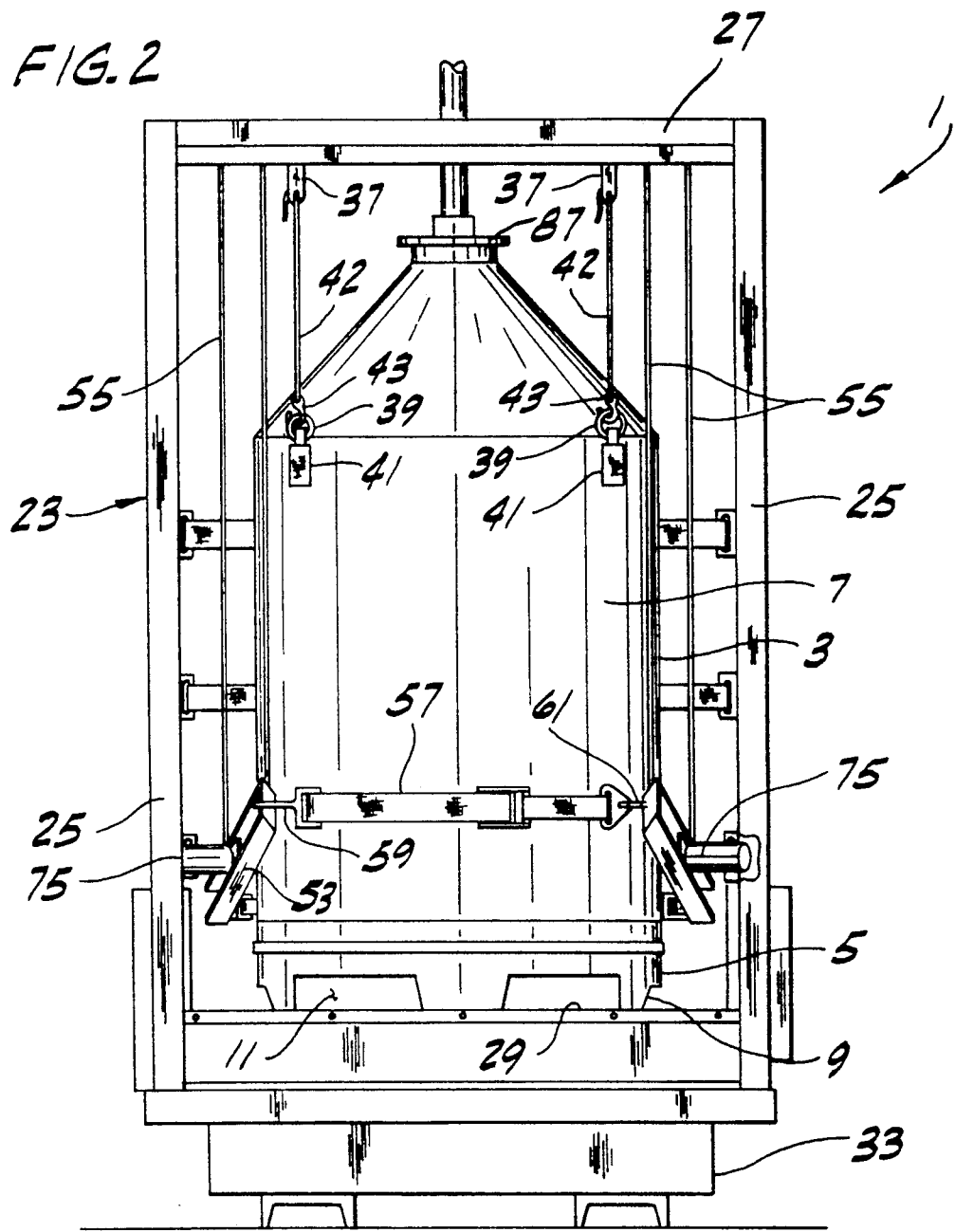
FIG. 2 is a rear elevation of the system.
Figure 5:
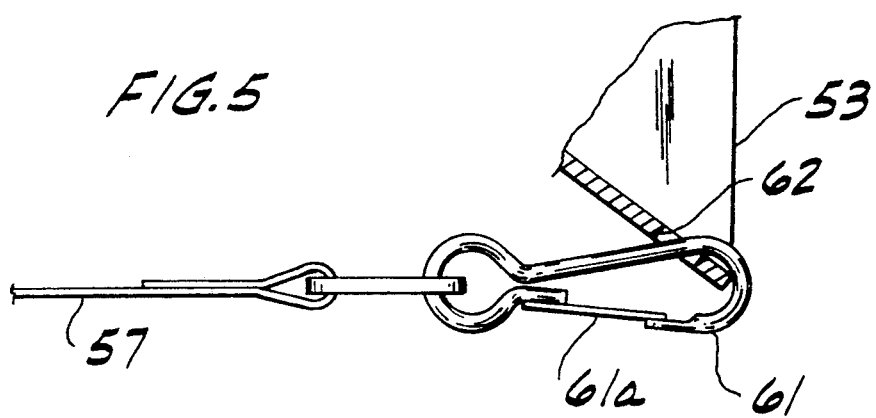
FIG. 5 is an enlarged fragment of FIG. 3 showing a releasable connection of a restraining strap to an arm of the system.
Figure 3:
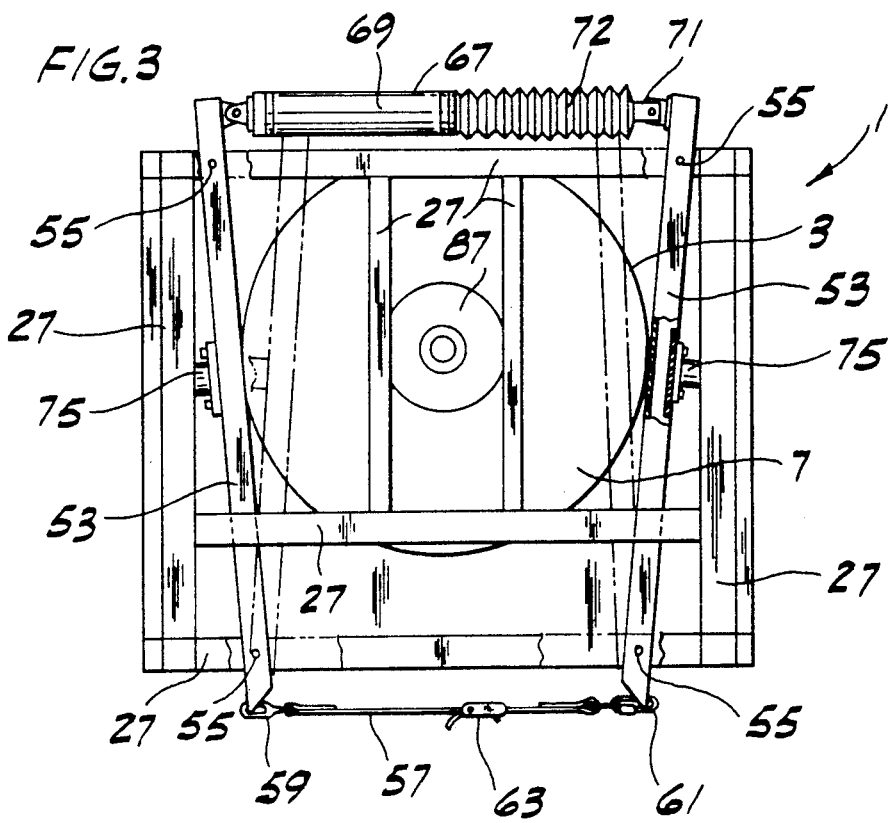
FIG. 3 is a top plan of the system.

A pair of arms 53 are freely suspended on generally laterally opposite sides of the frame 23 by flexible lines 55 made of steel cable, for example. The lines 55 are attached at one of their ends to respective top frame members 27, and at the other of their ends to respective arms 53. At the front of the frame (shown in FIG. 2), three vertically spaced straps 64 are mounted on and extend between side frame members 25 for retaining the container on the platform 29. At the rear of the frame 23 (shown in FIG. 1), the laterally opposing ends of the arms 53 are releasably connected by an elongate strap 57 made of limp sheet material which limits the lateral movement of the arms relative to one another at their rearward ends. Referring to FIG. 3, the left end of the strap 57 is fixedly connected to the left arm 53 by a connector 59. The right end of the strap 57 is releasably attached to the right arm 53 by a hook-shaped connector 61 receivable through an opening 62 in the right arm. As shown in FIG. 5, the connector 61 has a resilient arm 61A mounted on the connector to close the connector and secure the strap 57 to the arm. To unhook the connector 61 from the arm 53, the resilient arm 61A is pressed inwardly to open an end of the connector and the connector is removed from the opening 62. The length of the strap between the ends of the arms 53 may be adjusted using a buckle 63 on the strap.

As shown in FIG. 1, an air cylinder 67 including a tubular housing 69 and a piston rod 71 movable relative to the housing is located at the front of the frame 23. The piston rod 71 is substantially enclosed by a flexible bellows-type cover 72, and is mounted by a clevis pin connector 71A at its distal end to one (first) arm 53 for pivoting generally in a plane including both arms 53. The housing 69 is pivotally mounted at its end opposite the rod 71 by another clevis pin connector 69A to the other (second) arm 53 for pivoting generally in a plane including both arms 53. The cylinder 67 is supported by the arms 53 in a generally horizontal plane.

Figure 6:
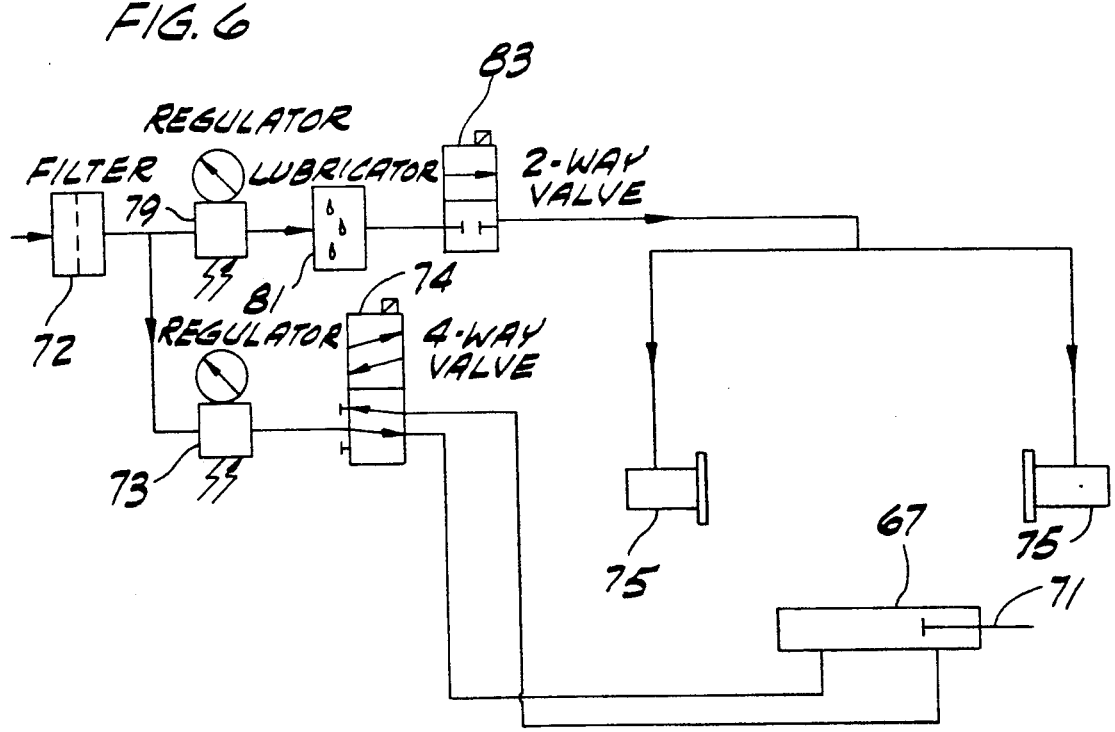
FIG. 6 is a pneumatic diagram for the system.
Figure 4:
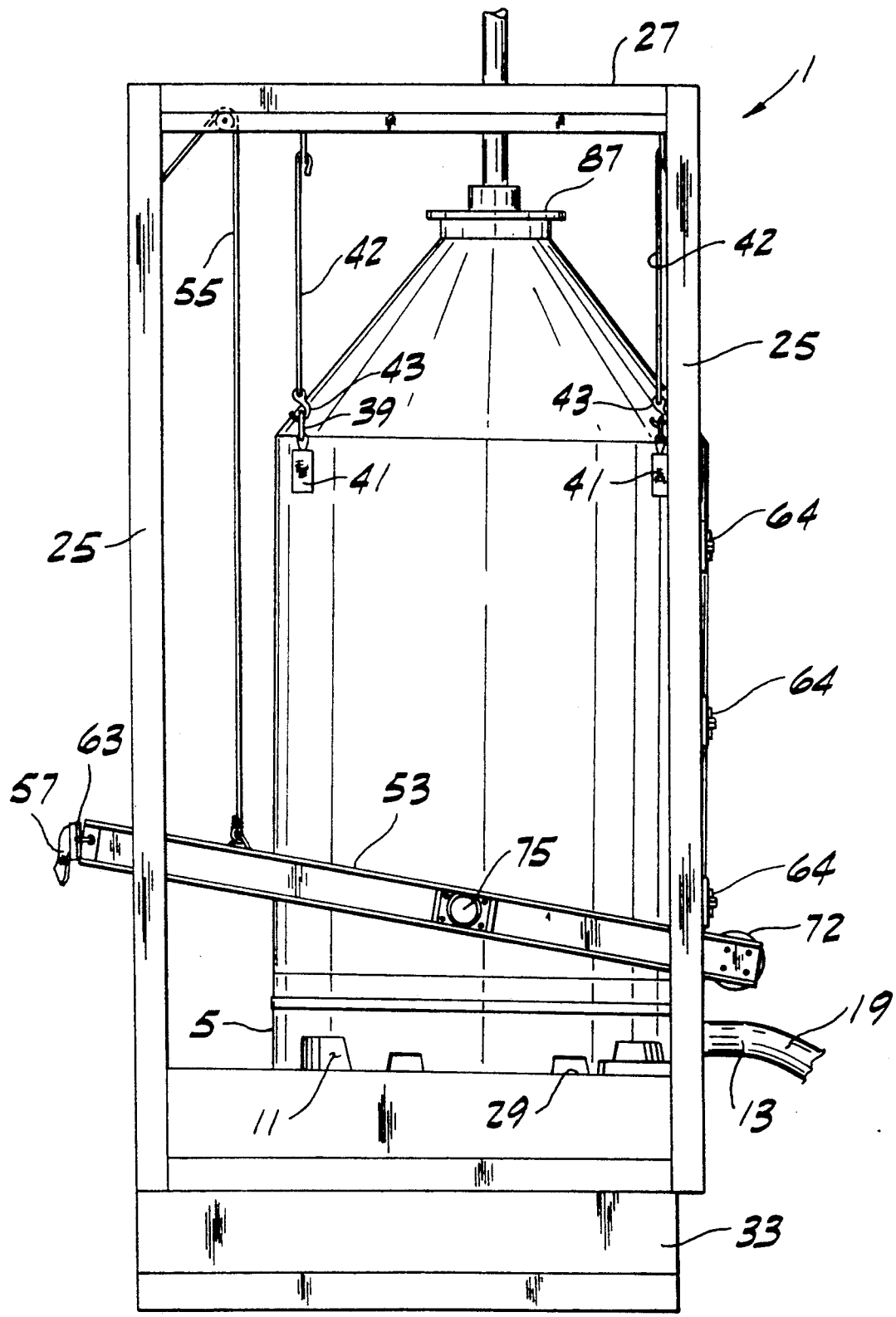
FIG. 4 is a side elevation of the system.

As shown in FIG. 6, the cylinder 67 is operated by compressed air from a source (not shown), which passes through a filter 72 and a pressure regulator 73. A four-way solenoid valve 74 controls the flow of air to the cylinder 67 for selectively extending and retracting the piston rod 71. As depicted in FIG. 3, the piston rod 71 is extended from the housing 69 and the arms 53 are in a first position laterally spaced from one another a distance greater that the width of the filled container 3. Actuation of the cylinder 67 to retract the piston rod 71 swings the arms 53 toward each other to a second position in which their lateral spacing is less that the width of the container 3 and the arms 53 squeezably engage opposite sides of the container bag wall 7.

In the preferred embodiment, a vibrator 75 is mounted on each arm 53 generally intermediate the forward and rearward end of the arm 53. Good results have also been achieved using only one vibrator 75 mounted on one of the arms 53. As shown and described herein, the vibrators 75 are pneumatic vibrators, such as the Model 50 vibrator manufactured by B.E.S.T., Inc. of Cleveland, Ohio. However, it is understood that the vibrators may be other than pneumatic (e.g., electric) and still fall within the scope of the present invention. As shown in the pneumatic diagram in FIG. 6, compressed air from a source of compressed air passes through the filter 72, a regulator 79, a lubricator 81 and a two-way solenoid valve 83 before reaching the vibrators to drive their oscillations. The solenoid valve 83 is selectively operable to activate and deactivate the vibrators 75, which in this embodiment are capable of delivering 6,000 cycles per minute of vibration to the arms 53 and container 3. These vibrations are directed in a generally side-to-side direction (laterally) relative to the frame 23.

To unload the container 3, the connector 61 of the strap 57 is unfastened from the right (as shown in FIG. 1) arm 53, and the strap is moved away to open the rear of the frame 23. The piston rod 71 has been previously extended to push the arms 53 apart a distance greater than the width of the container 3. A loaded container 3 is moved through the rear of the frame 23 between the laterally spaced rearward ends of the arms 53 onto the platform 29 by a forklift or the like. After placement of the container on the platform, the strap 57 is reconnected to the arm 53, and a vent 87 is attached to a vent opening (not shown) at the top of the wall bag 7 for venting air from the bag. The rings 39 are then connected to hooks 43 and the lines 42 secured for supporting bag 7 as the container 3 is emptied.

A plug (not shown) is removed from the outlet 17 and the transport conduit 19 is attached to the outlet for conveying material from the container 3. Another plug (not shown) is removed from the inlet 15 and a hose 13 from a source of compressed air is attached to the inlet. Compressed air is introduced into the container 3 through the inlet 15 and the material in the container is substantially uniformly fluidized, at which point the material begins to flow through the outlet 17 and into the transport conduit 19. The platform 29 is sloped slightly forwardly to facilitate movement of the fluidized material to the outlet 17.

After unloading of material from the container has begun, cylinder 67 may be activated to retract the piston rod 71 to bring the arms 53 closer together to a position in which the arms are spaced apart a distance less than the width of the container 3. The vibrators 75 are simultaneously activated by opening valve 83. The arms 53 squeeze and vibrate the flexible wall bag 7, causing any large clumps of material in the bag to break up and preventing the formation of air pockets or "bridging" which would cause less than all of the material being emptied from the container 3. As the container 3 is emptied, the piston rod 71 is further retracted to bring the arms 53 closer together. In this way, a relatively constant amount of squeezing and vibration can be applied to the material during most of the unloading process. The arms 53 may apply about 1,000 pounds of force to the container walls 7.

The arms 53, cylinder 67 and vibrators 75 are supported solely by the flexible lines 55 from the top frame members 27 so that the arms, cylinder and vibrators are free-floating. The lines 55 substantially dampen the vibrations of the vibrators 75 so that very little vibration is transmitted to the frame. Thus, the frame and other components of the system are protected from the damaging effects of the vibrations necessary to break up clumps of material in the container 3.

The squeezing and vibration are preferably applied to the container wall bag 7 only after fluidization of the interior and emptying of the material has begun. Otherwise the force of the arms 53 tends to compact the materials in the container into clumps which may be less easily disintegrated by the vibrations. Good results in preventing bridging of the material in the container have been achieved when the squeezing and vibration are applied after unloading has commenced. The emptying of the container 3 is monitored by observation of a readout (not shown) for the scale 33 on which the container rests. When the load is emptied, the compressed air to the container 3 is shut off, the hose 13 is disconnected from the inlet 15 and the transport conduit 19 is disconnected from the outlet 17. The cylinder 67 is activated to extend the piston rod 71 so that the arms 53 are moved out of engagement with the wall bag 7. Unless the container 3 is to be immediately refilled, the hooks 43 are removed from the rings 39 and the strap 57 is released from the rearward ends of the arms 53 so that the container may be removed from between the arms by the forklift. The system 1 is then ready to receive another container for unloading.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A system for unloading semi-bulk quantities of powdered or granular materials from a container made of flexible material, the system comprising means for supplying compressed gas to the interior of the container to fluidize the material therein, means attachable to the container for delivering fluidized material from the container, means for squeezing the container movable between a first position in which said squeezing means does not squeeze the container and a second position in which said squeezing means engages and squeezes the container, and means for vibrating the container, said vibrating means and said squeezing means being connected together to simultaneously vibrate and squeeze the container, said compressed gas supplying means, said squeezing means and said vibrating means being operable to simultaneously fluidize, squeeze and vibrate material in the container for facilitating unloading by breaking up clumps of material in the container and preventing the formation of air pockets in the container.

2. A system as set forth in claim 1 wherein said vibrating means is mounted on said squeezing means for movement therewith.

3. A system as set forth in claim 2 further comprising a frame for supporting said squeezing means and said vibrating means, and vibration dampening means attaching said squeezing means and said vibrating means to the frame to dampen vibration transmitted to the frame.

4. A system as set forth in claim 3 wherein said vibration dampening means comprises means for freely suspending said squeezing means and said vibrating means from the frame in substantial isolation from the frame.

5. A system as set forth in claim 4 wherein said vibration dampening means comprises a plurality of flexible lines having upper and lower ends, the lines being attached at their upper ends to the frame and at their lower ends to said squeezing means for freely suspending the squeezing means and vibrating means from the frame.

6. A system as set forth in claim 1 wherein said squeezing means comprises a pair of arms spaced generally laterally of one another and adapted to receive the container therebetween, and means for moving said arms between said first position in which the arms are laterally spaced apart a distance greater than the width of the container and said second position in which the arms are spaced apart a distance less that the width of the container and squeezably engage the container.

7. A system as set forth in claim 6 wherein said moving means comprises a cylinder located generally adjacent first ends of the arms, the cylinder including piston rod means extensible from and retractable into the cylinder.

8. A system as set forth in claim 7 further comprising means extending between and releasably connecting second ends of the arms opposite the first ends for limiting the lateral spacing of the second ends of the arms, said connecting means being removable from at least one of said arms to permit the container to be installed between the arms.

9. A system as set forth in claim 6 wherein said vibrating means comprises at least one vibrator mounted on each arm.

10. A system as set forth in claim 9 wherein said vibrators are pneumatically powered.

11. A system for unloading a container with a semi-bulk load of powdered or granular fluent material, said system comprising a container adapted to receive and contain said semi-bulk load and for fluidized unloading of said load, said container including a substantially rigid base, a bag of flexible sheet material sealably secured to said base for containing said load, the system further comprising means for supplying compressed gas to the interior of the container to fluidize the load, means attachable to the container for delivery of the load from the container, means for squeezing the container movable between a first position in which said squeezing means does not squeeze the container and a second position in which said squeezing means engages and squeezes the container, and means for vibrating the container, said vibrating means and said squeezing means being connected together to simultaneously vibrate and squeeze the container, said squeezing means and said vibrating means being operable to simultaneously fluidize, squeeze and vibrate material in the container conjointly for facilitating unloading by breaking up clumps of material in the container and preventing the formation of air pockets in the container.

12. A system as set forth in claim 11 wherein said vibrating means is mounted on said squeezing means for movement therewith.

13. A system as set forth in claim 12 further comprising a frame for supporting said squeezing means and said vibrating means, and vibration dampening means attaching said squeezing means and said vibrating means to the frame to dampen vibration transmitted to the frame.

14. A system as set forth in claim 13 wherein said vibration dampening means comprises means for freely suspending said squeezing means and said vibrating means from the frame in substantial isolation from the frame.

15. A system as set forth in claim 13 wherein said vibration dampening means comprises a plurality of flexible lines having upper and lower ends, the lines being attached at their upper ends to the frame and at their lower ends to said squeezing means for freely suspending the squeezing means and vibrating means from the frame.

16. A system as set forth in claim 11 wherein said squeezing means comprises a pair of arms spaced generally laterally of one another and adapted to receive the container therebetween, and means for moving said arms between said first position in which the arms are laterally spaced apart a distance greater than the width of the container and said second position in which the arms are spaced apart a distance less that the width of the container and squeezably engage the container.

17. A system as set forth in claim 16 wherein said moving means comprises a cylinder located generally adjacent first ends of the arms, the cylinder including piston rod means extensible from and retractable into the cylinder.

18. A system as set forth in claim 17 further comprising means extending between and releasably connecting second ends of the arms opposite the first ends for limiting the lateral spacing of the second ends of the arms, said connecting means being removable from at least one of said arms to permit the container to be installed between the arms.

19. A system as set forth in claim 16 wherein said vibrating means comprises at least one vibrator mounted on each arm.

20. A system as set forth in claim 19 wherein said vibrators are pneumatic.

21. A system for unloading powdered or granular materials from a container made of flexible material, the system comprising means for supplying compressed gas to the interior of the container to fluidize the material therein, means attachable to the container for delivering fluidized material from the container, means for squeezing the container movable between a first position in which said squeezing means does not squeeze the container and a second position in which said squeezing means engages and squeezes the container, means for vibrating the container mounted on said squeezing means for movement therewith, a frame for supporting said squeezing means and said vibrating means, and vibration dampening means attaching said squeezing means and said vibrating means to the frame to dampen vibration transmitted to the frame, the action of said squeezing means and said vibrating means facilitating the unloading by breaking up clumps of material in the container and preventing the formation of air pockets in the container.

22. A system for unloading a container with a load of powdered or granular fluent material, said system comprising a container adapted to receive and contain said load and for fluidized unloading of said load, said container including a substantially rigid base, a bag of flexible sheet material sealably secured to said base for containing said load, the system further comprising means for supplying compressed gas to the interior of the container to fluidize the load, means attachable to the container for delivery of the load from the container, means for squeezing the container movable between a first position in which said squeezing means does not squeeze the container and a second position in which said squeezing means engages and squeezes the container, and means for vibrating the container, said vibrating means being mounted on said squeezing means for movement therewith, the action of said squeezing means and said vibrating means facilitating unloading by breaking up clumps of material in the container and preventing the formation of air pockets in the container.

* * * * *